Patented Dec. 30, 1947

2,433,625

UNITED STATES PATENT OFFICE 2,433,625

BUBBLE COMPOSITIONS

August Raspet, Locust Valley, N. Y.

No Drawing. Application October 26, 1944,
Serial No. 560,519

1 Claim. (Cl. 252—307)

This invention relates in general to film-forming compositions and, in particular, to a process and composition for forming extremely thin aqueous films, and to correlated improvements designed to enhance the characteristics and properties and to extend the uses of such films.

Thin aqueous films are desirable for the study of surface tension phenomena, in air flow studies, optical experiments and for producing theatrical effects.

Heretofore, in the manufacture of thin aqueous films, it has been found that the lasting power of such films has been extremely short. This has been due, in part, to the tendency of the water in such prior films to evaporate, thus causing the film to break and form droplets. However, thin aqueous films should be characterized by being capable of being drawn into extremely thin films without breaking, and the films so produced should have high ductility and a substantial permanency.

Accordingly, it is a general object of the present invention to produce thin aqueous films which are extremely thin, highly ductile and substantially permanent.

Another object of the invention is to provide compositions for the production of such thin films.

It is a specific object of the invention to provide compositions for the production of bubbles which will be characterized by long life, substantial strength and resistance to breakage in air currents.

Other objects of the invention will in part be obvious and will in part appear hereinafter.

According to the present invention, thin aqueous films are formed by extending a composition comprising water, a surface tension depressant, and a major proportion of a hygroscopic agent. In the now preferred embodiment, the ratio of the hygroscopic agent to the water is so proportioned that the film will be in equilibrium with the moisture in the ambient atmosphere so that neither evaporation of water nor gain of water in the film will occur. In this way, a film or bubble having uniform properties, long lasting power and resistance to breakage in air currents, is produced.

The invention, accordingly, comprises an invention having the steps and relation of steps and the composition having the ingredients and proportions all as set forth in the following detailed description.

For the surface tension depressant, there is preferably employed a water-soluble wetting agent having a long chain, such, for example, as the sulphated higher aliphatic alcohols and the sulphonated higher fatty acids, saponin, and esters of sulphonated fatty acids of the type described in U. S. Patent 1,968,795, such as sodium or ammonium salts of the sulphuric acid ester of stearyl alcohol, and water-soluble sulphonates of a condensation product of naphthalene and a polymer of isobutylene as described in U. S. Patent 2,072,153; also dioctyl sodium sulfosuccinate (Aerosol OT).

For the hygroscopic agent there is preferably used a water-soluble organic compound, but inorganic hygroscopic agents may be used. By way of illustration but not by way of limiting the invention, there will be given the following examples of suitable hygroscopic agents: glycerine, the glycols, diethylene glycol, monoethyl ether of ethylene glycol, sorbitol, dextrose, triethanolamine and carbamide. As specific examples of such compounds may be mentioned: monoethanolamine glycollate, diethanolamine glycollate, triethanolamine glycollate, monoethanolamine lactate, diethanolamine lactate, and triethanolamine lactate. For the inorganic hygroscopic agent there may be employed sodium, potassium or ammonium acetate or phosphate, calcium or magnesium chloride, and calcium or magnesium nitrates.

The proportions of the several ingredients in the composition may be varied over relatively wide limits having regard to the type of film to be produced. In general, for the formation of bubbles of extremely thin walls, high ductility and substantial lasting qualities, a composition comprising from ½ to 5% by weight of the water-soluble surface tension depressant, from 10 to 20% of water, and the remainder a water-soluble hygroscopic agent, is suitable. In the now preferred embodiment, the proportion of water to hygroscopic agent is adjusted until, by test, it is found that there is no increase or decrease of the water in the composition when standing in the atmosphere in which the films or bubbles are to be used. In this way, a composition can be prepared so that there exists an equilibrium between the water in the composition and the vapor pressure of water in the ambient atmosphere. Accordingly, films and bubbles formed from such a composition will neither lose nor gain water and will remain stable for long periods of time.

The film-forming or bubble-forming characteristics of the present composition are improved by heating the composition and forming the films and bubbles therefrom while the liquid composition is at an elevated temperature such, for example, as a temperature from 30° to 75° C., preferably 40 to 50° C. Where a ring or blow pipe is used for forming the bubble, it is sufficient in most cases to heat the ring or pipe to such a temperature.

It is to be understood that the function of the surface tension depressant is to lower the surface tension of the aqueous composition and promote the spreading and film-forming characteristics of the composition. The function of the hygroscopic agent is two-fold: (a) it serves as a film-forming agent and (b) it prevents the loss of water from the film and its breakage as a result of evaporation. The use of a major proportion of the hygroscopic agent in the composition is one of the chief distinguishing features of the present composition from prior aqueous film-forming compositions. In the prior compositions, the major proportion consisted of water and an extremely small percentage consisted of soap. The net result was that with such prior compositions, the film was formed chiefly of water molecules. Water is not a good film-forming agent. On the contrary, it has a very high surface tension. In contrast, the present composition employs the hydroscopic agent as the film-forming material and the water constitutes only a very small proportion and serves only as a diluent. Prior aqueous compositions invariably lost water to the atmosphere by evaporation, while the present composition will absorb water from the atmosphere rather than lose it when exposed to normal atmospheric temperatures and humidities. It appears that with applicant's composition an equilibrium is soon established between the water vapor pressure of the water in the film and the vapor pressure of the water in the atmosphere.

Thus, it is seen that all of the ingredients coact to produce a composition which is not only extremely easy to form into films, but which once formed remain as thin films without loss by evaporation which normally results in breakage. When the films are to be produced in an atmosphere of known or controlled humidity, it is possible to vary the ratio of the water to hygroscopic agent so that the film produced from the composition will be in equilibrium with the water in the ambient atmosphere. No prior aqueous film-forming composition was characterized by the features of absorbing moisture from the atmosphere or of being in aqueous equilibrium therewith, and it is these characteristics which render the present composition superior for producing films of high permanency.

By way of illustration but not by way of limiting the invention, there will be given the following specific examples:

Example I

For producing a film for the study of surface tension phenomena, there is prepared a composition comprising 2% Aerosol OT, 15% water, and the remainder glycerine. This composition is capable of being formed into films by immersing a loop of wire into the composition and slowly withdrawing the loop. It is characterized by being substantially permanent and therefore capable of use for a long period of time.

Example II

For forming bubbles for the study of air flow phenomena, there is prepared a composition comprising 3% by weight of Aerosol OT, 10% by weight of water, and the remainder diethylene glycol. Such composition may be readily blown into bubbles and it will be found that such bubbles can be placed in a strong air stream of atmospheric humidity without breaking as a result of evaporation. As a matter of fact, such bubbles will actually float on the surface of a body of water without rupture.

Example III

For the study of optical properties of thin films, the composition of Example II is prepared with the addition of a water-soluble compound whose optical properties are to be studied. By forming a film from the resulting composition, it is possible to study the optical properties of the unknown material while extending in an extremely thin film.

Example IV

A composition for forming films for surface tension measurements comprises 5/10 part tergitol O8 (a sulfated fatty alcohol), 20 parts water and 79.5 parts sorbitol. A tenacious film is formed which does not break and which can be handled and even transferred from one wire loop to another in the measurements of surface tension.

If the viscosity of the composition is too high, it may be lowered by heating the composition rather than by diluting it with more water. As a matter of fact, the films appear to be formed somewhat easier when the temperatures are elevated slightly above room temperature, that is, from room temperature to about 75° C.

The present invention has provided a composition for forming extremely thin aqueous films which are characterized by being extremely thin, by having a high ductility and a substantial permanency.

A composition of the present invention is particularly adapted for use in forming bubbles because such bubbles are strong and have a long life. Bubbles so formed are especially adapted for use in advertising display and theatrical effects. For example, in advertising there may be employed a device comprising a surface on which appears a representation of a head of a man or animal having an open mouth, a hole being provided in the surface through the mouth. The composition of the invention may be placed in a reservoir behind the mouth, and the composition formed into bubbles and ejected through the mouth by any suitable device. In this way, an intermittent or substantially constant stream of long lasting bubbles may be caused to issue from the mouth giving an animated effect. In a similar manner, the composition may be produced for forming bubbles for theatrical effects.

Since certain changes in carrying out the above process and certain modifications in the composition which embody the invention may be made without departng from its scope, it is intended that all matter contained in the above description shall be interpreted as illustrative and not in a limiting sense.

Having described my invention, what I claim as new and desire to secure by Letters Patent is:

A composition for forming air borne bubbles comprising from ½ to 5% by weight of dioctyl sodium sulfosuccinate, water and a major proportion of glycerine, the glycerine constituting the sole film-forming agent in said composition.

AUGUST RASPET.

REFERENCES CITED

The following references are of record in the file of this patent:

UNITED STATES PATENTS

| Number | Name | Date |
| --- | --- | --- |
| 1,423,720 | Jennings | July 25, 1922 |
| 1,423,721 | Jennings | July 25, 1922 |
| 1,443,538 | Howard | Jan. 30, 1923 |
| 2,088,085 | Gross | July 27, 1937 |